(12) United States Patent
Yuan et al.

(10) Patent No.: US 9,964,221 B2
(45) Date of Patent: *May 8, 2018

(54) JET VALVE SPOOL (71) Applicant: GUANGZHOU SEAGULL KITCHEN AND BATH PRODUCTS CO., LTD., Guangzhou, Guangdong (CN)

(72) Inventors: Xunping Yuan, Guangdong (CN); Zhiqiang Tang, Guangdong (CN)

(73) Assignee: GUANGZHOU SEAGULL KITCHEN AND BATH PRODUCTS CO., LTD., Guangdong (CN)

( * ) Notice: Subject to any disclaimer, the term of this patent is extended or adjusted under 35 U.S.C. 154(b) by 546 days.

This patent is subject to a terminal disclaimer.

(21) Appl. No.: 14/419,163

(22) PCT Filed: Sep. 26, 2013

(86) PCT No.: PCT/CN2013/084283
§ 371 (c)(1),
(2) Date: Feb. 2, 2015

(87) PCT Pub. No.: WO2014/173072
PCT Pub. Date: Oct. 30, 2014

(65) Prior Publication Data
US 2015/0240955 A1    Aug. 27, 2015

(30) Foreign Application Priority Data
Apr. 27, 2013  (CN) .......................... 2013 1 0153953

(51) Int. Cl.
F16K 11/04 (2006.01)
F04F 5/10 (2006.01)
(Continued)

(52) U.S. Cl.
CPC ............ *F16K 11/04* (2013.01); *B05B 1/3046* (2013.01); *F04F 5/10* (2013.01); *F04F 5/463* (2013.01);
(Continued)

(58) Field of Classification Search
CPC . E03C 1/08; E03C 1/0408; B05B 1/06; B05B 1/326; B05B 1/3046; F04F 5/10;
(Continued)

(56) References Cited

U.S. PATENT DOCUMENTS 5,174,324 A    12/1992  Chrysler
5,228,604 A *  7/1993  Zanini .................... B67C 3/281
                                              222/504
(Continued)

FOREIGN PATENT DOCUMENTS

CN       2221762 Y      3/1996
CN     101801792 A      8/2010
(Continued)

OTHER PUBLICATIONS

International Search Report issued in PCT/CN2013/084283 dated Feb. 20, 2014 (4 pages).
(Continued)

*Primary Examiner* — Arthur O Hall
*Assistant Examiner* — Juan C Barrera
(74) *Attorney, Agent, or Firm* — Osha Liang LLP (57) ABSTRACT

A jet valve spool includes: a spool housing on which is provided with a cold water port and a hot water port; a spray nozzle arranged in the valve core shell and having a cold water inlet of the spray nozzle and a cold water outlet of the spray nozzle, with the cold water inlet and the cold water outlet being in communication with a cold water channel of a valve by means of the cold water opening; and a spray needle which can be assembled inside the spray nozzle, can
(Continued)

form a cold water inflow space with an inner chamber of the spray nozzle, and form a cold water jetting outlet with the cold water outlet of the spray nozzle, wherein the position of the spray needle in the axial direction of the jet valve core is fixed, and the position of the spray nozzle in the axial direction of the jet valve core is adjustable.

20 Claims, 4 Drawing Sheets (51) Int. Cl.
*F04F 5/46* (2006.01)
*B05B 1/30* (2006.01)
*F24H 9/20* (2006.01)
(52) U.S. Cl.
CPC .... *F24H 9/2007* (2013.01); *Y10T 137/86879* (2015.04)
(58) Field of Classification Search
CPC . F04F 5/461; F04F 5/463; F16K 11/04; F24H 9/2007; Y10T 137/86879
USPC .......... 137/625.4, 605, 607; 239/407, 416.4, 239/416.5, 417.3
See application file for complete search history.

(56) References Cited

U.S. PATENT DOCUMENTS

| | | | | |
|---|---|---|---|---|
| 7,802,588 | B2* | 9/2010 | Doutt | F16K 11/044 137/606 |
| 8,079,382 | B2* | 12/2011 | Wu | F16K 3/08 137/454.5 |
| 2009/0218536 | A1* | 9/2009 | Wears | F16K 11/044 251/319 |
| 2009/0301605 | A1* | 12/2009 | Mengibar Rivas | B67C 3/281 141/260 |
| 2010/0313959 | A1* | 12/2010 | Termansen | B65B 39/004 137/1 |
| 2013/0175365 | A1* | 7/2013 | Ergut | F23D 14/22 239/407 |

FOREIGN PATENT DOCUMENTS

| | | |
|---|---|---|
| CN | 102086941 A | 6/2011 |
| CN | 102767210 A | 11/2012 |
| CN | 102909139 A | 2/2013 |
| CN | 103016421 A | 4/2013 |
| CN | 202884121 U | 4/2013 |
| CN | 203209229 U | 9/2013 |
| CN | 203214940 U | 9/2013 |
| CN | 203214955 U | 9/2013 |
| CN | 203214961 U | 9/2013 |
| CN | 203309162 U | 11/2013 |
| DE | 102005041438 A1 | 3/2007 |
| GB | 1462765 A | 1/1977 |
| JP | 59-151679 A | 8/1984 |

OTHER PUBLICATIONS

Office Action issued in corresponding Chinese Application No. 201310153953.7 dated Jun. 23, 2014, and English translation thereof (9 pages).

Office Action issued in corresponding Chinese Application No. 201310153953.7 dated Aug. 26, 2014, and English translation thereof (7 pages).

* cited by examiner

JET VALVE SPOOL

CROSS REFERENCE TO RELATED APPLICATIONS

This is a national stage application based on PCT/CN2013/084283, filed on Sep. 26, 2013, which claims priority to Chinese Patent Application No. CN 201310153953.7, filed on Apr. 27, 2013. This application claims the benefits and priority of these prior applications and incorporates their disclosures by reference in their entireties.

TECHNICAL FIELD

The present invention relates to the technical field of valves for mixing water, and specially relates to a jet valve spool used for mixing of cold water and hot water for solar water heater.

BACKGROUND

Solar water heating system has been widely recognized by the society and has been widely used.

A Chinese patent literature CN 103016421A discloses a jet device and a water heater comprising the jet device, wherein the temperature regulating principle for the outlet water is as described below. The water inflow rates of cold water and hot water are adjusted by controlling left and right handles of a valve, and the cold water and hot water at different flow rates are mixed in the jet device to form water for use, which is of different temperatures. In the state of jet, the sucking effect of hot water depends on the pressure of the cold water. Once adjusting the handles to turn down a valve spool for cold water, the proportion of cold water will be reduced directly and the jetting speed of working liquid of cold water will be reduced, which will cause the water pressure of the working liquid in the nozzle of the jet device to be reduced directly, making the sucking effect of hot water unsatisfactory.

Therefore, it is required to provide an adjustable jet device used for adjusting the mixing ratio of cold water and hot water, in order to achieve a function of enhancing jetting pressure and a function of adjusting temperature.

In practice, a telescopic needle is used in an adjustable jet device and is disposed inside a nozzle, in order to adjust the flow rate of cold water (working fluid). For example, a Chinese patent literature CN 102767210A discloses an adjustable jet device with multiple water sources, comprising a jet body, a fluid working chamber disposed inside the jet body, a nozzle disposed on the front end of the fluid working chamber, and a needle disposed inside the fluid working chamber and located on an extension line of the centerline of the nozzle, wherein the needle is provided with a control device disposed on one end thereof and used for controlling the moving distance of the needle, and the needle is able to move in the axial direction of the nozzle under the control of the control device, in order to adjust the jetting flow rate of the nozzle.

For a water heater in such a structure as described above, the jetting flow rate of cold water of the nozzle is adjustable via the needle, while the flow rate of hot water is unadjustable. As a result, there will always have a proportion of hot water mixed in the water outflow, making the temperature of the water outflow unable to be close or equal to the temperature of the cold water. The users will feel the water is relatively hot in summer but have no ways to adjust the temperature of the water, resulting in a waste of hot water.

In view of the problem described above, a Chinese patent literature CN 102086941B discloses a valve for mixing water, comprising a valve body which is provided with a cold water inlet, a hot water inlet and a water outlet thereon, and further comprising a nozzle communicated with the cold water inlet and provided with a needle valve used for helping to adjust the flow rate of cold water, wherein the flow rate of hot water is adjustable by screwing the nozzle into or out of the valve body, and the flow rate of cold water is adjustable via adjusting the cross section of the water outlet by screwing the needle valve in or out.

A water heater comprising the valve for mixing water as described in CN 102086941B has the function of adjusting flow rates of cold and hot water. However, it still has some disadvantages as used in practice. Firstly, as the nozzle is rotated to adjust the flow rate of hot water, the needle valve will move along with the nozzle, and will be relatively stationary to the cold water outlet of the nozzle, so the jetting effect of the nozzle will be substantively constant as the flow rate of the hot water is changed, and thus it is unable to meet different bathing requirements from users. Secondly, although the flow rate of the cold water is adjustable via the needle valve, two handles are needed to adjust the nozzle and the needle respectively, and as used by users, the two handles are needed to be adjusted repeatedly and alternately by the users, in order to reach a comfortable bathing temperature, making the use inconvenient. Finally, as the position of the cold water inlet of the nozzle relative to the cold water inlet of the valve body is adjusted by axially rotating the nozzle to control the flow rate of cold water, the flow rate of cold water will be affected and the pressure inside the nozzle will be reduced, which will affect the jetting effect. Therefore, the needle valve has to be used to adjust the flow rate and temperature of the water outflow.

SUMMARY OF INVENTION

One objection of the present invention is to solve the problem that the valve for mixing water for the water heater in the prior art has an unsatisfactory jetting effect and is inconvenient to be used, and thus provides a jet valve spool which has a good jetting effect and is convenient to be used.

In order to solve the above mentioned problem, the present invention provides a jet valve spool, comprising a spool housing, provided with a cold water port and a hot water port thereon; a nozzle, disposed within said spool housing and having a cold water inlet communicated with a cold water passage of a valve through said cold water port, and a cold water outlet;

a needle, adapted for being configured inside said nozzle, for coordinating with an inner cavity of said nozzle to form a cold water inflow space and coordinating with said cold water outlet to form a cold water jetting outlet; wherein said needle is unmovable in the axial direction of said jet valve spool, and said nozzle is movable in the axial direction of said jet valve spool, and fluid flow rates of said cold water inflow space, said hot water port and said cold water jetting outlet are adjustable simultaneously by axially moving said nozzle.

The jet valve spool further comprises a rotatable member, rotatably disposed on said spool housing in a sealing manner and forming an axial movable adaptation with said nozzle via an axial movement adjusting means, so as to allow a rotating movement of said rotatable member to be converted to an axial movement of the nozzle.

Said rotatable member is connected with said needle so as to drive said needle to rotate simultaneously; said spool housing coordinates with said nozzle via a rotation limiting part to prevent said nozzle from rotating relative to said spool housing, as said rotatable member drives said needle to rotate, and via said movement adjusting means to allow said nozzle to move in the axial direction of said needle relative to said spool housing.

Said axial movement adjusting means comprises an internal thread formed on said nozzle and an external thread formed on said rotatable member adapted for being engaged with said internal thread; and the distance for which said internal thread is engaged with said external thread is larger than or equal to the distance for which said nozzle is able to move.

Said rotation limiting part is a polygonal end portion formed on said nozzle, and the shape of said polygonal end portion matches with the shape of an inner wall of said spool housing.

Said rotation limiting part comprises a flange and/or a guide groove circumferentially disposed on an outer circumferential surface of said nozzle, and a guide groove and/or a flange axially disposed on the inner wall of said spool housing and forming a movable adaptation with said flange and/or guide groove.

Said cold water inlet and said cold water outlet of said nozzle have a pair of circumferential flanges formed therebetween extending radially outward, and said circumferential flanges allow a sealing element to be disposed therebetween, and a hot water segment of said nozzle located between said circumferential flanges and said cold water outlet is able to be communicated with a hot water passage of the valve.

Said hot water segment is cylindrical in shape.

The diameter of said cold water outlet of said nozzle is 4 mm-6 mm.

Said needle comprises a needle body, and a conical portion disposed on one end of said needle body and engaged with said cold water outlet of said nozzle, and said needle body is circumferentially provided with a supporting member, so as to allow outer surface of said supporting member to coordinate with the inner cavity of said nozzle, in order to limit the position of said needle body and to form a fluid passage on said supporting member, as said needle is disposed inside said nozzle.

Said supporting member comprises a plurality of ribs uniformly and circumferentially arranged around said needle body and extending in the axial direction of said needle body, and each two said ribs have one said fluid passage formed therebetween.

Said rib comprises a first rib part and a second rib part; and said first rib part is arranged towards said cold water inlet of said nozzle and has a radial dimension smaller than that of said second rib part, so as to coordinate with said inner wall of said nozzle to form said fluid passage, and an adaptation is formed between an outer surface of said second rib part and said inner cavity of said nozzle.

Said nozzle has a groove formed on the inner wall thereof and corresponding to said second rib part, and said second rib part is adapted for being fitted in said groove and sliding in the axial direction of said nozzle.

The number of said ribs is three, four or six; and the sum of the cross section of all the fluid passages formed between said ribs is larger than the cross section of said cold water outlet of said nozzle.

Said supporting member of said needle body and said conical portion have a water pressurizing and mixing segment formed therebetween, and said water pressurizing and mixing segment is cylindrical in shape.

The diameter of said water pressurizing and mixing segment is larger than, or equal to, or slightly smaller than the diameter of said cold water outlet of said nozzle.

The diameter of said conical portion is larger at a root thereof and smaller at a front end thereof, and the conical degree of said conical portion is 10°-450°, and the length of said conical portion is smaller than or equal to the distance for which said nozzle is movable.

The conical degree of the cold water jetting outlet of said nozzle is larger than or equal to the conical degree of said conical portion.

The diameter of said conical portion is gradually reduced in a linear manner from said root to said front end.

The cold water pressure at said cold water inlet on said nozzle is always consistent with the cold water pressure at said cold water port on said spool housing, as said nozzle is moved in the axial direction of said jet valve spool.

The present invention has the following advantages:

For the jet valve spool of the present invention, the needle in the spool housing is unmovable in the axial direction of said jet valve spool, and said nozzle is movable in the axial direction of said jet valve spool, so that the cold water inflow space, the hot water port and the cold water jetting outlet are able to be adjusted simultaneously by axially moving the nozzle. In other words, the flow rates of cold water and hot water are able to be adjusted simultaneously only by moving the nozzle in the axial direction of the jet valve spool.

For the jet valve spool of the present invention, the cold water pressure at the cold water inlet on the nozzle is always consistent with the cold water pressure at the cold water port on the spool housing, as the nozzle is moved in the axial direction of the jet valve spool, so that the jetting pressure inside the nozzle is able to be maintained as the nozzle is moved.

For the jet valve spool of the present invention, the needle body is circumferentially provided with a supporting member, so as to allow outer surface of the supporting member to coordinate with the inner cavity of the nozzle, in order to limit the position of the needle body and to form a fluid passage on the supporting member for fluid flowing, as said needle is disposed inside said nozzle, so that when the pressure of a fluid flowing through the nozzle is relatively high or very high and the flowing speed of the fluid is unstable, it is able to efficiently prevent the needle from deviating from the water outlet of the nozzle or swinging radially due to a high and non-uniform radial pressure in the radial direction, without affecting the flowing of the fluid, and ensuring the jetting effect of the nozzle.

For the jet valve spool of the present invention, the supporting member comprises a plurality of ribs uniformly and circumferentially arranged around the needle body and extending in the axial direction of the needle body, and each two said ribs have one fluid passage formed therebetween, facilitating the flowing of the fluid. Further, the rib comprises a first rib part and a second rib part, and the first rib part has a radial dimension smaller than that of the second rib part, so that the jetting effect of the nozzle can be further enhanced.

For the jet valve spool of the present invention, the supporting member of the needle body and the conical portion have a water pressurizing and mixing segment formed therebetween, and the water pressurizing and mixing segment is cylindrical in shape, so that water introduced by the fluid passage can be mixed uniformly and be pressurized here, so as to ensure final jetting effect of the nozzle.

BRIEF DESCRIPTION OF THE DRAWINGS

In order that the content of the invention is more readily understood clearly, the invention will be further described in details according to particular embodiments of the invention in conjunction with the accompanying drawings, in which.

The numeral reference and related components in the appended drawings are provided as bellow:
1—needle body, 1a—water pressurizing and mixing segment, 2—conical portion, 2a—root, 2b—front end, 3—fluid passage, 4—rib, 41—first rib part, 42—second rib part, 9—nozzle, 91—cold water inlet of the nozzle, 92—cold water outlet of the nozzle, 93—polygonal end portion, 94—circumferential flange, 95—hot water segment, 96—conical portion of the nozzle, 11—pipe, 11a—conical portion of the pipe, 12—spool housing, 12a—hot water port, 12b—cold water port, 13—rotatable member, 15—cold water inflow space, and 16—cold water jetting outlet.

DETAILED EMBODIMENTS OF THIS INVENTION

Detailed embodiments of the invention will now be elucidated in conjunction with the drawings.

Figure 1:
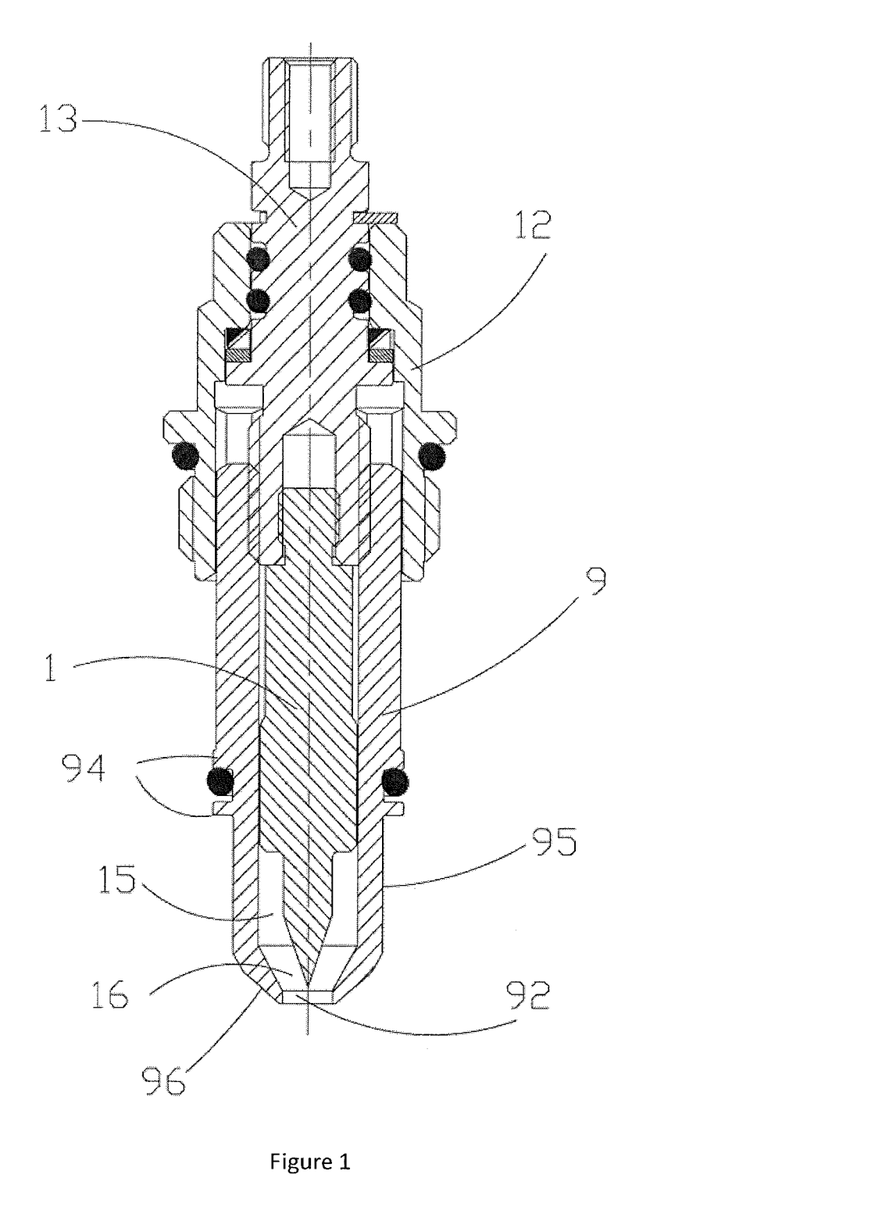
FIG. 1 is a schematic sectional view of the structure of a jet valve spool provided in one embodiment of the present invention.
Figure 2:
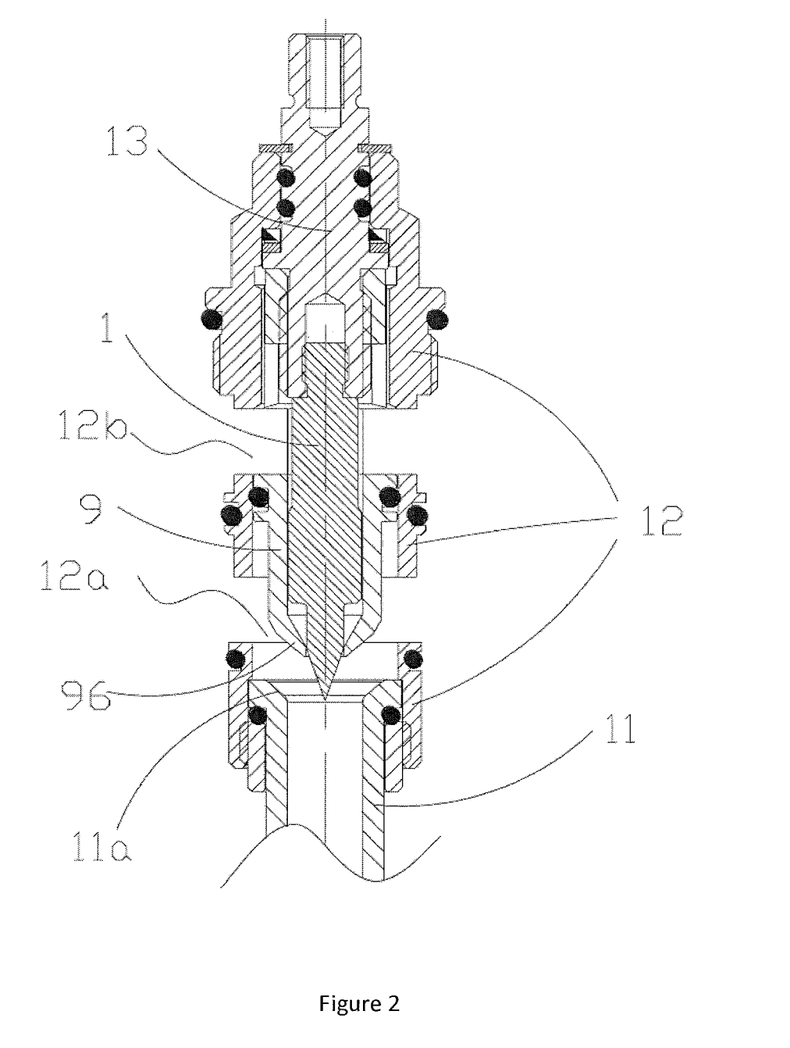
FIG. 2 is a schematic sectional view showing the coordination of the jet valve spool with a pipe of a valve in one embodiment of the present invention.

As shown in FIGS. 1 and 2, a jet valve spool of an embodiment of the present invention comprises a spool housing 12, a nozzle 9 and a needle. The spool housing 12 is provided with a cold water port 12b adapted for being communicated with a cold water passage of a valve and a hot water port 12a adapted for being communicated with a hot water passage of the valve.

The nozzle 9 is disposed inside the spool housing 12, and has a cold water inlet 91 adapted for being communicated with the cold water passage of the valve via the cold water port 12b, and a cold water outlet 92 adapted for being communicated with a pipe 11 of the valve.

The needle is adapted for being configured inside said nozzle 9, for coordinating with an inner cavity of said nozzle 9 to form a cold water inflow space 15 communicated with the cold water inlet 91 of the nozzle, and coordinating with the cold water outlet 92 of the nozzle to form a cold water jetting outlet 16, and the cold water jetting outlet 16 is conical in shape.

The needle is unmovable in the axial direction of the jet valve spool, and the nozzle 9 is movable in the axial direction of the jet valve spool, and fluid flow rates of the cold water inflow space 15, hot water port 12a (shown in FIG. 2) and cold water jetting outlet 16 are adjustable simultaneously by axially moving the nozzle 9. In other words, the flow rates of cold water and hot water are able to be adjusted simultaneously and conveniently only by moving the nozzle in the axial direction of the jet valve spool.

Moreover, the cold water pressure at the cold water inlet 91 of the nozzle is always consistent with the cold water pressure at the cold water port 12b on the spool housing 12, as the nozzle 9 is moved in the axial direction of the jet valve spool. This purpose can be achieved in two ways described as below:

In first way, the opening width of the cold water inlet 91 of the nozzle in the axial direction of the needle is larger than or equal to the sum of the opening width of the cold water port 12b in the axial direction and the distance for which the nozzle 9 is able to move, so that the cold water port 12b is always within the range of the opening width of the cold water inlet 91 of the nozzle as the nozzle 9 is moved, and thus the jetting pressure of the cold water inside the nozzle is able to be always maintained.

In second way, the opening width of the cold water port 12b in the axial direction of the needle is larger than or equal to the sum of the opening width of the cold water inlet 91 of the nozzle in the axial direction of the needle and the distance for which the nozzle 9 is able to move, so that the cold water inlet 91 of the nozzle is always within the range of the opening width of the cold water port 12b as the nozzle 9 is moved, and thus the jetting pressure of the cold water inside the nozzle is able to be always maintained.

In order to move the nozzle 9 in the axial direction conveniently, the jet valve spool in the embodiment of the present invention further comprises a rotatable member 13 used for helping to move the nozzle 9 in the axial direction. The rotatable member 13 is rotatably disposed on the spool housing 12 in a sealing manner via a sealing element such as O ring, and forms an axial movable adaptation with the nozzle 9 via an axial movement adjusting means (as will be discussed in more detail below), so as to allow a rotating movement of the rotatable member 13 to be converted to an axial movement of the nozzle 9.

Particularly, for example, the axial movement adjusting means may be a rack and a pinion engaged therewith, for transmitting a driving force. In more detail, the nozzle 9 is provided with the rack thereon, and the rotatable member 13 coordinates with the pinion in a linkage manner to drive the nozzle 9 to move in the axial direction.

In a preferred embodiment, as shown in FIGS. 1 and 2, the rotatable member 13 is connected with the needle to drive the needle to rotate simultaneously. Particularly, in order to facilitate processing, the rotatable member 13 has an internal threaded hole formed on one end thereof connected with the needle, and the needle has an external threaded portion formed on one end thereof, and the rotatable member 13 is able to be connected with the needle via thread engagement. Alternatively, the rotatable member 13 may be integrally molded with the needle.

At the same time, the spool housing 12 coordinates with the nozzle 9 via a rotation limiting part (as will be discussed in more detail below) to prevent the nozzle 9 from rotating relative to the spool housing 12, as the rotatable member 13 drives the needle to rotate, and via the movement adjusting means to allow the nozzle 9 to move in the axial direction of the needle relative to the spool housing 12.

Particularly, the axial movement adjusting means may comprise an internal thread formed on one end of the nozzle 9, wherein the end is coordinated with the rotatable member 13, and comprise an external thread formed on the rotatable member 13 and adapted for being engaged with the internal thread; and the distance for which the internal thread is engaged with the external thread is larger than or equal to the distance for which the nozzle is able to move, i.e. the distance from the cold water outlet 92 of the nozzle to the pipe 11 of the valve, as the nozzle 9 is in a state that the cold water flow is cut off as shown in FIG. 2. In this way, as shown in FIGS. 1 and 2, the needle is adapted for being driven to rotate inside the inner cavity of the nozzle 9 by the rotation of the rotatable member 13, and the rotation limiting part is adapted for preventing the nozzle 9 from rotating relative to the spool housing 12. The nozzle 9 is adapted for moving in reciprocating manner in the axial direction of the needle due to the thread engagement between the nozzle 9 and the rotatable member 13, so that the fluid flow rates of the cold water inflow space 15, the hot water port 12a (as shown in FIG. 2) and the cold water jetting outlet 16 are able to be adjusted simultaneously and conveniently.

In addition, for the configuration that the rotatable member 13 is adapted for driving the needle to rotate, the axial movement adjusting means may be structured in other forms, for example, in the form of engagement of helical pinion and rack which is able to convert rotary movement of the helical pinion to movement of the rack. In detail, the nozzle 9 is provided with the rack, and the rotatable member 13 is provided with the helical pinion, so that the nozzle 9 is adapted for being driven to move in the axial direction of the needle by the rotation of the rotatable member 13.

In addition, the rotation limiting part may be structured in many different forms, and some forms will be discussed in detail below, and it should be appreciated that the rotation limiting part is not limited to these forms.

Figure 3:
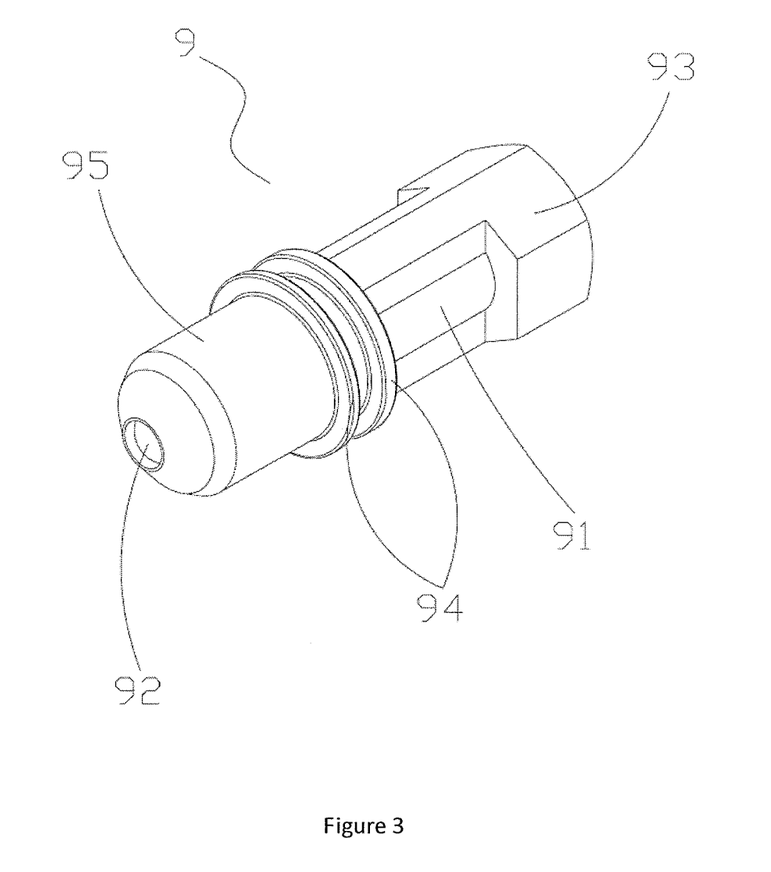
FIG. 3 is a schematic view of the stereostructure of the nozzle of the jet valve spool in one embodiment of the present invention.

Referring to FIG. 3, in one embodiment, the rotation limiting part is a polygonal end portion 93 formed on the nozzle 9, such as a common hexagonal nut shaped end portion, and correspondingly, the shape of the inner wall of the spool housing 12 matches with the shape of the polygonal end portion 93, or the spool housing 12 has a polygonal inner cavity portion formed on the inner wall of the spool housing 12 and adapted for forming a coordination with the polygonal end portion 93 in locking manner.

In a preferred embodiment, the polygonal end portion 93 is a hexagonal nut, and the internal thread of the axial movement adjusting means is formed on the inner wall of the hexagonal nut.

In another embodiment, the rotation limiting part comprises a flange and/or a guide groove circumferentially disposed on an outer circumferential surface of the nozzle 9, and a guide groove and/or a flange axially disposed on the inner wall of the spool housing 12 and forming a movable adaptation with the flange and/or guide groove. In other words, the rotation limiting part comprises a flange circumferentially disposed on the end of the nozzle 9, and a guide groove axially disposed on the inner wall of the spool housing 12 and forming a movable adaptation with the flange; or the rotation limiting part comprises a flange disposed on the inner wall of the spool housing 12 and a guide groove axially disposed on the end of the nozzle 9 and forming a movable adaptation with the flange; or the rotation limiting part comprises a guide groove and a flange disposed on the inner wall of the spool housing 12, and a flange and a guide groove disposed on the end of the nozzle 9 and forming an adaptation with the guide groove and the flange disposed on the inner wall of the spool housing 12.

Referring to FIG. 3, the cold water inlet 91 and the cold water outlet 92 of the nozzle 9 have a pair of circumferential flanges 94 formed therebetween and extending radially outward, and the circumferential flanges 94 allow a sealing element to be disposed therebetween, and a hot water segment 95 of the nozzle 9 located between the circumferential flanges 94 and the cold water outlet 92 is able to be communicated with a hot water passage of the valve.

Referring to FIG. 2, after the nozzle 9 coordinates with the spool housing 12, the cold water port 12b and the hot water port 12a of the spool housing 12 are separated in a sealing manner by the circumferential flanges 94 and the sealing member. In this way, the cold water will flow through the cold water port 12b, the cold water inlet 91 of the nozzle, a fluid passage 3 on the needle (as will be described in detail below), the cold water inflow space 15, the cold water jetting outlet 16 and the cold water outlet 92 of the nozzle; and the hot water port 12a is able to be adjusted by axially moving the nozzle 9.

Referring to FIG. 2, a conical portion of the needle is completely engaged with the cold water outlet 92 of the nozzle, and the cold water flow is cut off, and hot water of high temperature is available. As moving the nozzle 9 downwards toward the pipe 11 of the valve, the cross section of the hot water port 12a allowing hot water to flow through will be reduced, and the flow rate of hot water will decrease and meanwhile the flow rate of cold water will increase, and as a result the temperature of the water flowing out will be decreased correspondingly. In this way, the temperature of the water flowing out is able to be adjusted until reaching a suitable temperature. As the conical portion 96 of the nozzle 9 is completely engaged with the conical portion 11a of the pipe 11, the hot water flow is cut off, and in this way, cold water is available, and hot water is saved. As moving the nozzle 9 upwards away from the pipe 11 of the valve, the flow rate of cold water will decrease and the flow rate of hot water will increase correspondingly.

Preferably, the hot water segment 95 is cylindrical in shape, in order to ensure smooth flowing of the hot water.

The diameter of the cold water outlet 92 of said nozzle 9 is 3 mm-10 mm, and preferably 4 mm-6 mm.

In addition, as shown in FIG. 1, the conical degree of the cold water jetting outlet 16 of the nozzle 9 is larger than the conical degree of the conical portion 2 (as will be described in detail below) disposed on the end of the needle.

The structure of the needle of the jet valve spool of the present invention will be described in detail below.

Figure 4:
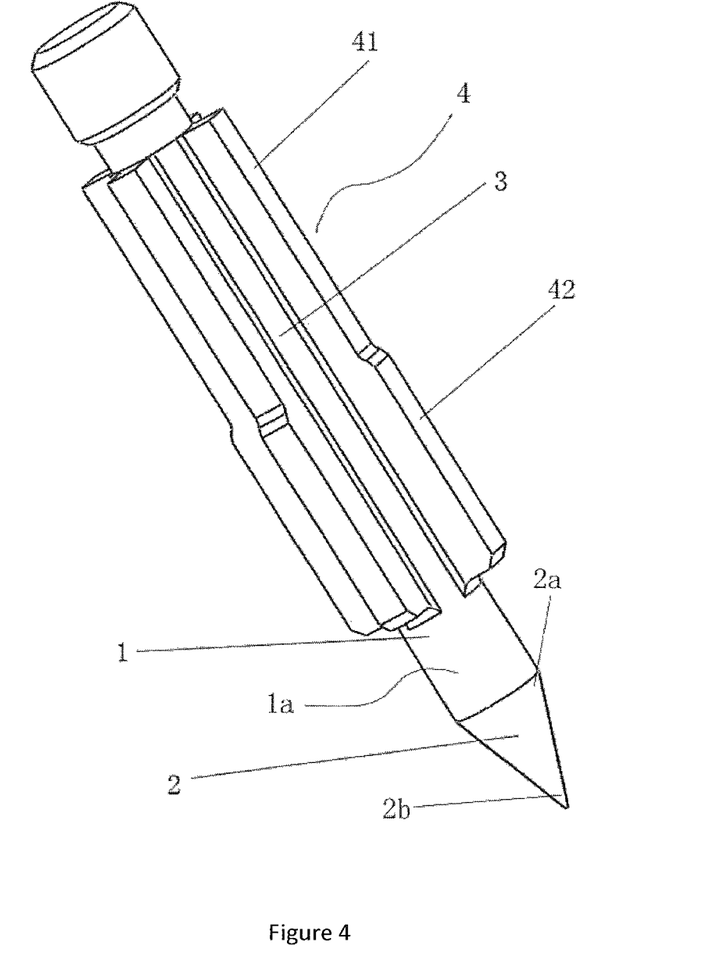
FIG. 4 is a schematic view of the stereostructure of the needle of the jet valve spool in one embodiment of the present invention.

Referring to FIGS. 4 and 5, the needle of the jet valve spool of the present invention comprises a needle body 1, and a conical portion 2 disposed on the end of the needle body 1, wherein the needle body 1 is provided with a supporting member circumferentially disposed on the outer surface thereof. As the needle is disposed inside the nozzle 9 of the jet valve spool, the outer surface of the supporting member is allowed to coordinate or contact with the inner cavity of the nozzle 9 so as to limit the position of the needle body 1 and correspondingly form a fluid passage 3 on the supporting member, wherein the fluid passage 3 is used for fluid to flow through.

In practice, the structure of the needle is able to efficiently prevent the needle from deviating from the water outlet of the nozzle 9 or swinging radially due to suffering of a high and non-uniform radial pressure in the radial direction, without affecting the smooth flowing of the fluid, even though the pressure of the fluid flowing through the nozzle 9 is relatively high or very high and the flowing speed of the fluid is unstable, i.e. the needle suffers very different radial pressures at different parts thereof in the longitudinal direction of the needle, thereby avoiding affecting the jetting effect of the cold water outlet 92 of the nozzle 9.

In practice, the supporting member having the effect and function as described above can be structured in many different forms, and some forms will be discussed in detail below with the help of drawings, but it should be appreciated that, the supporting member is not limited to these forms, and various changes, substitutions and modifications may be made by those skilled in the art.

First Form of Structure of the Supporting Member

Referring to in FIG. 1, the supporting member comprises a plurality of ribs 4 uniformly and circumferentially arranged around the outer surface of the needle body 1 and extending in the axial direction of the needle, and each two said ribs 4 have one fluid passage 3 formed therebetween. In this way, after the needle is assembled with the nozzle, the rib 4 is able to coordinate with the inner cavity of the nozzle in a contacting manner, so as to limit the position of the needle body.

In actual processing, the rib 4 may be formed by the method of machining such as cutting, and also may be formed together with the needle body 1 by the method of one-step molding such as casting or injection molding, etc. An appropriate forming method may be chosen depending on the actual demand.

Further, in order to enhance the jetting effect of the nozzle, the rib 4 comprises a first rib part 41 and a second rib part 42. The first rib part 41 is arranged towards the cold water inlet of the nozzle after the rib 4 coordinates with the nozzle, and has a radial dimension smaller than that of the second rib part 42, and is able to coordinate with the inner wall of the nozzle to form the fluid passage 3, so as to uniformly direct water from the water inlet of the nozzle into the fluid passage 3 of the needle. The outer surface of the second rib part 42 is able to form an adaptation with the inner cavity of the nozzle, so as to achieve a rib 4 with an improved structure, ensuring that the position of the needle is able to be limited and also the jetting effect of the nozzle 9 is able to be enhanced.

The length of the first rib part 41 depends on the axial dimension of the water inlet of the nozzle, and is generally equal to the sum of the length of the water inlet of the nozzle in the axial direction of the needle and the distance for which the needle or the nozzle is able to move.

It should be noted that, the first rib part 41 herein may be only a cylinder. In order to enhance the strength of the needle body 1, the rib 4 preferably comprises the first rib part 41.

In addition, the dimension of the outer diameter of the second rib part 42 depends on the sum of the cross section area of all the fluid passages 3. The sum of the cross section areas of all the fluid passages 3 is larger than the maximum cross section area of the nozzle in a completely open state, so as to ensure a minimum loss of the water pressure between the outlets of the nozzle.

In this way, the needle is able to rotate inside the nozzle under the limitation of the supporting member, and the nozzle is able to move relative to the needle in the axial direction of the needle. Such kind of coordination between the needle and the nozzle may be applied to the situation where a rotatable member 13 is comprised. The rotatable member 13 is able to drive the needle to rotate, so as to drive the nozzle to move in the axial direction of the needle.

The following describes another type of coordination of the nozzle 9 and the second rib part 42, where the rotatable member 13 is unable to be used. In detail, the nozzle 9 has a groove formed on the inner wall thereof, wherein the groove corresponds to the second rib part 42 and extends in the axial direction of the nozzle 9, and the second rib part 42 is adapted for being fitted in the groove and sliding in the axial direction of the nozzle. In such a structure, the groove has the function of guiding the needle and preventing the needle from rotating. That is to say, the nozzle is only able to move reciprocally in the axial direction of the needle, and the needle is unable to rotate inside the nozzle. In use, the needle is unmovable in the axial direction of the jet valve spool, and the nozzle is movable in the axial direction of the jet valve spool via an external device such as a pulling member connected with the end of the nozzle or by directly pressing the end of the nozzle, so that the cold water inflow space 15, the hot water port 12a and the cold water jetting outlet 16 are able to be adjusted simultaneously.

In order to facilitate processing and avoid pressure loss of cold water before reaching the outlet of the nozzle, the number of the ribs 4 preferably is three, four or six, so as to ensure that the sum of the cross section of the fluid passages 3 formed between the ribs is larger than the cross section of outlet of the nozzle. However, the number of the ribs 4 is not limited to the above mentioned number, and also may be two, five or more.

Second Form of Structure of the Supporting Member

The supporting member in the second form is an annular supporting board disposed on the needle body 1. The annular supporting board is provided with a plurality of diversion holes formed thereon and serving as the fluid passage.

The annular supporting board may have a proper thickness depending on the actual demand. Besides, the diversion holes are not limited to be circular in shape, and also may be fan-shaped holes. The diversion holes should be arranged in such a manner that they have no or slight influence on the flow rate of the fluid flowing therethrough. For example, an arc in favor of the flowing of fluid is formed on the joint of the diversion holes and surface of the annular supporting board.

Third Form of Structure of the Supporting Member

The supporting member is a ring connected with the needle body 1 via a plurality of rib strips, and each two said rib strips have one said fluid passage 3 formed therebetween.

The ring and the rib strip are shaped to be in favor of smooth flowing of fluid and therefore have no or only slight influence on the flowing of the fluid.

The above only describes three forms of structure of the supporting member, but the supporting member is not limited to these three structure forms.

In addition, as shown in FIG. 4, in order to prevent the supporting member of the needle from interfering with the conical surface of the inner cavity at the cold water jetting outlet as the conical portion 2 of the needle is completely fitted with the cold water outlet of the nozzle, the supporting member of the needle body 1 and the conical portion 2 preferably have a water pressurizing and mixing segment 1a formed therebetween, and the water pressurizing and mixing segment 1a is cylindrical in shape. After the needle is assembled with the nozzle, as shown in FIG. 1, the water pressurizing and mixing segment 1a of the needle and the inner wall of the nozzle are able to have a cold water inflow space 15 formed therebetween, so as to ensure that the fluids introduced by the fluid passages are able to be mixed uniformly and be pressurized before arriving at the jetting conical surface formed by the conical portion 2 and the cold water outlet 92 of the nozzle, and therefore to ensure good jetting effect of the cold water outlet 92 of the nozzle 9.

Referring to FIG. 2, as the needle is moved towards the cold water outlet 92 of the nozzle in the axial direction of the nozzle 9, the conical portion 2 of the needle will gradually coordinate with the cold water outlet 92 of the nozzle. In order to prevent cold water from spouting out of the cold water outlet 92 of the nozzle as the conical portion 2 completely coordinates with the cold water outlet 92 of the nozzle, the diameter of the water pressurizing and mixing segment 1a is larger than, or equal to, or slightly smaller than the diameter of the cold water outlet 92 of the nozzle.

Herein the term "larger than" and "equal to" mean that the cold water outlet 92 of the nozzle is able to be closed completely by the water pressurizing and mixing segment 1a when the conical portion 2 completely coordinates with the cold water outlet 92 of the nozzle, so as to prevent cold water from spouting out of the cold water outlet 92 of the nozzle.

The term "slightly smaller" means that the diameter of the water pressurizing and mixing segment 1a is slightly different from the diameter of the cold water outlet 92 of the nozzle, so that the outer circumferential surface of the water pressurizing and mixing segment 1a and the inner circumferential surface of the cold water outlet 92 of the nozzle will have a slight gap formed therebetween when the conical portion 2 completely coordinates with the cold water outlet 92 of the nozzle. In this way, although a slight amount of water may be jetted out of the cold water outlet 92 of the nozzle through the gap, the generated influence on the hot water flowing over the outer wall of the nozzle 9 will be slight and negligible.

The length of the water pressurizing and mixing segment 1a should not be too short, or the water outflow of the nozzle may be bifurcate, i.e. the length of the water pressurizing and mixing segment 1a is related with the cross section of the fluid passage, the cross section of the outlet of the nozzle and the thickness of the supporting member, but it will not cause a significant influence.

In addition, as shown in FIG. 4, the diameter of the conical portion 2 is larger at the root 2a thereof and smaller at the front end 2b thereof. The conical degree of the conical portion 2 is 10° 450°, including 10° and 150°. The length of the conical portion 2 is smaller than or equal to the distance for which the nozzle 9 is movable. In this way, the cold water outlet 92 of the nozzle is able to form a proper coordination with the conical portion 2.

Correspondingly, the conical degree of the cold water jetting outlet 16 of said nozzle is larger than or equal to the conical degree of the conical portion 2 of said needle, so as to achieve a minimum pressure loss.

In addition, the diameter of said conical portion 2 is gradually reduced in a linear manner from the root 2a to the front end 2b, in other words, the conical portion 2 is structured in the form of a cone. In order to let the fluid flow smoothly, the conical portion 2 is able to form a linear coordination with the cold water outlet 92 of the nozzle 9, as shown in FIG. 2. Alternatively, the surface of the conical portion 2 also may be structured in a non-linear manner in accordance with the fluid mechanics or be structured in a parabolic manner, so that proper adjustments may be made automatically according to different flowing speeds of the fluid.

While particular embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

What is claimed is:

1. A jet valve spool, comprising:
    a spool housing provided with a cold water port and a hot water port thereon;
    a nozzle, disposed within said spool housing and having a cold water inlet communicated with a cold water passage of a valve through said cold water port, and a cold water outlet;
    a needle, adapted for being configured inside said nozzle, for coordinating with an inner cavity of said nozzle to form a cold water inflow space and coordinating with said cold water outlet to form a cold water jetting outlet; and
    a rotatable member, rotatably disposed on said spool housing in a sealing manner and forming an axial movable adaptation with said nozzle via an axial movement adjusting means, so as to allow a rotating movement of said rotatable member to be converted to an axial movement of the nozzle;
    wherein said needle is unmovable in the axial direction of said jet valve spool, and said nozzle is movable in the axial direction of said jet valve spool, and fluid flow rates of said cold water inflow space, said hot water port and said cold water jetting outlet are adjustable simultaneously by axially moving said nozzle;
    wherein said rotatable member is connected with said needle so as to drive said needle to rotate simultaneously; and
    wherein said spool housing coordinates with said nozzle via a rotation limiting part to prevent said nozzle from rotating relative to said spool housing, as said rotatable member drives said needle to rotate, and via said movement adjusting means to allow said nozzle to move in the axial direction of said needle relative to said spool housing.

2. The jet valve spool of claim 1, wherein said axial movement adjusting means comprises an internal thread formed on said nozzle, and an external thread formed on said rotatable member and adapted for being engaged with said internal thread; and the distance for which said internal thread is engaged with said external thread is larger than or equal to the distance for which said nozzle is able to move.

3. The jet valve spool of claim 1, wherein said rotation limiting part is a polygonal end portion formed on said nozzle, and the shape of said polygonal end portion matches with the shape of an inner wall of said spool housing.

4. The jet valve spool of claim 1, wherein said rotation limiting part comprises a flange and/or a guide groove circumferentially disposed on an outer circumferential surface of said nozzle, and a guide groove and/or a flange axially disposed on the inner wall of said spool housing and forming a movable adaptation with said flange and/or guide groove.

5. The jet valve spool of claim 1, wherein said cold water inlet and said cold water outlet of said nozzle have a pair of circumferential flanges formed therebetween extending radially outward, and said circumferential flanges allow a sealing element to be disposed therebetween, and a hot water segment of said nozzle located between said circumferential flanges and said cold water outlet is able to be communicated with a hot water passage of the valve.

6. The jet valve spool of claim 5, wherein said hot water segment is cylindrical in shape.

7. The jet valve spool of claim 1, wherein the diameter of said cold water outlet of said nozzle is 4 mm-6 mm.

8. The jet valve spool of claim 1, wherein said needle comprises a needle body, and a conical portion disposed on one end of said needle body and engaged with said cold water outlet of said nozzle, and said needle body is circumferentially provided with a supporting member, so as to allow outer surface of said supporting member to coordinate with the inner cavity of said nozzle, in order to limit the position of said needle body and to form a fluid passage on said supporting member, as said needle is disposed inside said nozzle.

9. The jet valve spool of claim 8, wherein said supporting member comprises a plurality of ribs uniformly and circumferentially arranged around said needle body and extending in the axial direction of said needle body, and each two said ribs have one said fluid passage formed therebetween.

10. The jet valve spool of claim 9, wherein said rib comprises a first rib part and a second rib part; and said first rib part is arranged towards said cold water inlet of said nozzle and has a radial dimension smaller than that of said second rib part, so as to coordinate with said inner wall of said nozzle to form said fluid passage, and an adaptation is formed between an outer surface of said second rib part and said inner cavity of said nozzle.

11. The jet valve spool of claim 10, wherein said nozzle has a groove formed on the inner wall thereof and corresponding to said second rib part, and said second rib part is adapted for being fitted in said groove and sliding in the axial direction of said nozzle.

12. The jet valve spool of claim 9, wherein the number of said ribs is three, four or six; and
the sum of the cross section of all fluid passages formed between said ribs is larger than the cross section of said cold water outlet of said nozzle.

13. The jet valve spool of claim 8, wherein said supporting member of said needle body and said conical portion have a water pressurizing and mixing segment formed therebetween, and said water pressurizing and mixing segment is cylindrical in shape.

14. The jet valve spool of claim 13, wherein the diameter of said water pressurizing and mixing segment is larger than, or equal to, or slightly smaller than the diameter of said cold water outlet of said nozzle.

15. The jet valve spool of claim 8, wherein the diameter of said conical portion is larger at a root thereof and smaller at a front end thereof, and the conical degree of said conical portion is 10°-150°, and the length of said conical portion is smaller than or equal to the distance for which said nozzle is movable.

16. The jet valve spool of claim 15, wherein the conical degree of the cold water jetting outlet of said nozzle is larger than or equal to the conical degree of said conical portion.

17. The jet valve spool of claim 16, wherein the diameter of said conical portion is gradually reduced in a linear manner from said root to said front end.

18. The jet valve spool of claim 1, wherein the cold water pressure at said cold water inlet on said nozzle is always consistent with the cold water pressure at said cold water port on said spool housing, as said nozzle is moved in the axial direction of said jet valve spool.

19. A jet valve spool, comprising:
a spool housing provided with a cold water port and a hot water port thereon;
a nozzle, disposed within said spool housing and having a cold water inlet communicated with a cold water passage of a valve through said cold water port, and a cold water outlet;
a needle, adapted for being configured inside said nozzle, for coordinating with an inner cavity of said nozzle to form a cold water inflow space and coordinating with said cold water outlet to form a cold water jetting outlet;
wherein said needle is unmovable in the axial direction of said jet valve spool, and said nozzle is movable in the axial direction of said jet valve spool, and fluid flow rates of said cold water inflow space, said hot water port and said cold water jetting outlet are adjustable simultaneously by axially moving said nozzle; and
wherein said needle comprises a needle body, and a conical portion disposed on one end of said needle body and engaged with said cold water outlet of said nozzle, and said needle body is circumferentially provided with a supporting member, so as to allow outer surface of said supporting member to coordinate with the inner cavity of said nozzle, in order to limit the position of said needle body and to form a fluid passage on said supporting member, as said needle is disposed inside said nozzle.

20. The jet valve spool of claim 19, wherein said supporting member comprises a plurality of ribs uniformly and circumferentially arranged around said needle body and extending in the axial direction of said needle body, and each two said ribs have one said fluid passage formed therebetween.

* * * * *